S. W. BABBITT.
COVERED PITCHERS.
No. 194,858. Patented Sept. 4, 1877.
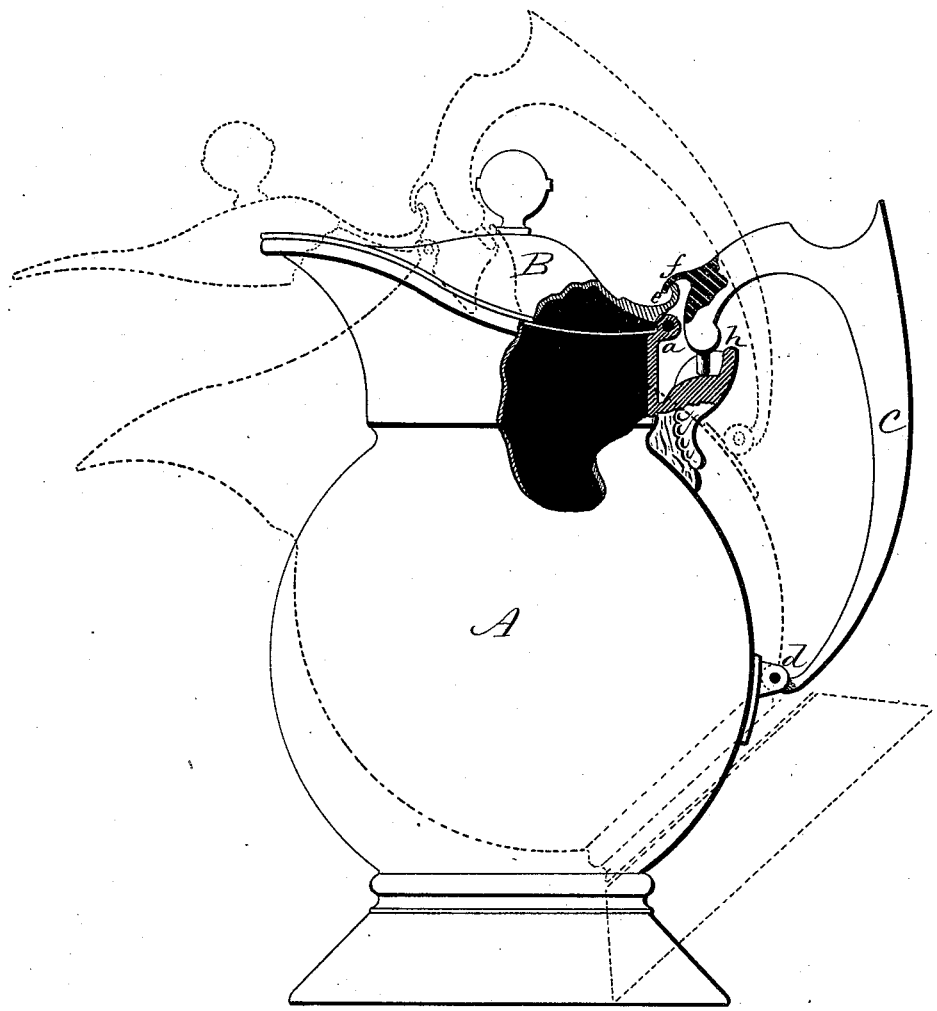

UNITED STATES PATENT OFFICE.

S. WILLIAM BABBITT, OF WEST MERIDEN, CONNECTICUT, ASSIGNOR TO WILCOX SILVER PLATE COMPANY, OF SAME PLACE.

IMPROVEMENT IN COVERED PITCHERS.

Specification forming part of Letters Patent No. 194,858, dated September 4, 1877; application filed June 30, 1877.

*To all whom it may concern:*

Be it known that I, S. WILLIAM BABBITT, of West Meriden, in the county of New Haven and State of Connecticut, have invented a new Improvement in Covered Pitchers; and I do hereby declare the following, when taken in connection with the accompanying drawings and the letters of reference marked thereon, to be a full, clear, and exact description of the same, and which said drawings constitute part of this specification, and represent a sectional side view.

This invention relates to an improvement in that class of pitchers and like articles which are provided with covers, which must be opened when tilted for the purpose of pouring out the contents, the object being such a construction as will automatically open the cover when the pitcher is tilted, and insure its automatic closing when set upright.

The invention consists in a cover hinged to the vessel opposite the pouring-spout, combined with a handle jointed to the vessel below the hinge of the cover, and connected to the cover near its hinge, so that, drawing the upper end of the handle backward, as in lifting or tilting the pitcher, the cover will be raised and remain open until the pitcher is set upright and the handle released; then the cover closes by its own weight, returning the handle to its normal condition.

In illustrating the invention it is shown as applied to a pitcher; but it will be understood that the vessel may be other than a pitcher, and of any desirable shape.

A is the body; B, the cover hinged to the body at $a$ in the usual manner; C, the handle, the general form of which is immaterial, hinged to the body, as at $d$, below the hinge of the cover. Its upper end connection with the cover is here represented by a projection, $e$, on the cover above the hinge, and a corresponding projection, $f$, on the handle; hence, if the upper end of the handle be drawn backward, it will correspondingly move the projection $e$, and with it the cover, which turns up from the front and opens the pitcher. If the handle be taken in hand, as for lifting or tilting the pitcher, as seen in broken lines, the power exerted in lifting, or the weight of the pitcher, causes such a movement of the handle and pitcher from each other that the cover will be raised; then, when the pitcher is again set upright and the handle left free, the cover will close of its own gravity, drawing the handle forward into its normal condition.

A stop, $h$, is arranged to arrest the opening so soon as the desired extent is attained.

The connection between the cover, made as shown, leaves the cover free to be opened wide without movement of the handle; but the connection may be positive. In such case the extent of movement should be sufficient to open the cover wide.

By the term "pouring-spout" it is not intended to limit this invention to vessels which have a pouring-spout, but the term is used as defining a point in the pitcher opposite the handle, and over which the contents are naturally poured.

I do not broadly claim a pitcher having the cover arranged so that it is automatically opened by means of the handle, as such I am aware is not new.

I claim—

The combination, in a pitcher or similar article, of the hinged cover, the handle hinged at its lower end to the body of the pitcher, and connected at its upper end to the body of the pitcher, so as to allow it to swing toward and from the hinge of the cover, and a connection between the handle and cover, substantially as described, so that the movement from the pitcher opens the cover, substantially as specified.

S. WM. BABBITT.

Witnesses:
A. L. OTIS,
W. H. H. SANTY.